United States Patent
Breslau et al.

(10) Patent No.: US 6,345,311 B1
(45) Date of Patent: *Feb. 5, 2002

(54) METHOD AND SYSTEM OF DYNAMICALLY MOVING OBJECTS BETWEEN HETEROGENEOUS EXECUTION ENVIRONMENTS

(75) Inventors: Franklin Charles Breslau, Teaneck, NJ (US); Paul Gregory Greenstein, Croton-on-Hudson; John Ted Rodell, Wappingers Falls, both of NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/578,098

(22) Filed: Dec. 27, 1995

(51) Int. Cl.7 .................................................. G06F 9/54
(52) U.S. Cl. ........................ 709/310; 709/100; 709/102
(58) Field of Search ................................. 395/683, 701, 395/706; 709/300–305, 100, 101, 102, 103, 106, 310, 312; 712/222; 707/523

(56) References Cited

U.S. PATENT DOCUMENTS

| | | | | |
|---|---|---|---|---|
| 5,197,138 A | * | 3/1993 | Hobbs et al. ................ | 712/222 |
| 5,313,635 A | * | 5/1994 | Ishizuka et al. ............. | 395/706 |
| 5,377,350 A | * | 12/1994 | Skinner ....................... | 395/600 |
| 5,381,534 A | * | 1/1995 | Shi .............................. | 395/200 |
| 5,410,696 A | * | 4/1995 | Seki et al. ................... | 395/706 |
| 5,442,791 A | * | 8/1995 | Wrabetz et al. .............. | 395/650 |
| 5,450,567 A | * | 9/1995 | Mori et al. ................... | 395/706 |
| 5,535,393 A | * | 7/1996 | Reeve et al. ................. | 395/706 |
| 5,613,148 A | * | 3/1997 | Bezviner et al. ............. | 395/800 |
| 5,692,183 A | * | 11/1997 | Hapner et al. ............... | 395/614 |
| 5,701,484 A | * | 12/1997 | Artsy .......................... | 709/303 |
| 5,708,828 A | * | 1/1998 | Coleman ..................... | 707/523 |

FOREIGN PATENT DOCUMENTS

| | | |
|---|---|---|
| JP | PUPA06-348666 | 12/1994 |
| JP | PUPA07-044383 | 2/1995 |
| JP | PUPA07-123108 | 5/1995 |

OTHER PUBLICATIONS

Eric H. Herrin II and Raphael A. Finkel, "An Implementation of Service Rebalancing," COMPUTER SCIENCE, pp. 295–311 (1992).

(List continued on next page.)

*Primary Examiner*—Majid A. Banankhah
(74) *Attorney, Agent, or Firm*—Heslin Rothenber Farley & Mesiti P.C.

(57) ABSTRACT

In object oriented-computer systems, objects execute in different, heterogeneous execution environments. During runtime, an object is identified that should desirable execute in another, heterogeneous execution environment. Usage of the object in the current execution environment is terminated, and the object is instantiated in the other, heterogeneous execution environment. During the movement, the state of the object is preserved despite differences in state variable formatting between the execution environments.

60 Claims, 11 Drawing Sheets

OTHER PUBLICATIONS

Eric H. Herrin II and Raphael A. Finkel, "The Benefits of Service Rebalancing," Proceedings, Third Workshop on Workstation Operating Systems, IEEE Computer Society Press, pp. 104–110 (Apr. 1992).

Fu et al, "a concurrent programming environment for memory–mapped persistent object systems"; IEEE Digital Library, pp. 291–298; 1993.*

Little et al; "Maintaining information about persistent replicated objects in a distributed system"; IEEE digital library; pp. 491–498; 1993.*

Shrivastava et al: structuring fault–tolerant object systems for modularity in a distributed environment;, IEEE Digital Library; pp. 421–432; 1994.*

OMG TC Document 94.9.15, "Object Externalization Service", 1994.*

Black et al; "Implementing location independent invocation", IEEE digital library, pp. 107–119; 1990.*

Mendelzon et al, "Object migration", ACM digital library, 1994.*

Chin et al, "Distributed object–based programming systems", ACM digital library, 1991.*

Rogers et al, "Supporting dynamic data structures on distributed memory machines", ACM digital library, 1995.*

Ciampolini et al, "The benefits of migration in a parallel objects programming environment", IEEE electronic library, 1994.*

OMG TC document No. 93.11.3, "IBM/JOSS Object services pesistence service specification", pp. 1–43, 1993.*

Millard, Bruce et al.; 'Run–Time Support and Storage Management for Memory–Mapped Persistent Objects'; IEEE; pp. 508–515; 1993.*

Corradi, A. et al; Distributed Environments Based on Objects Upgrading Smalltalk Toward Distribution, IEEE; pp. 332–339, 1990.*

Berbers, Yolande et al; 'The Xenoops Project', IEEE; pp. 144–146; 1991.*

Betz, Mark; Interoperable objects: laying the foundation for distributed object computing; Dr. Dobb's Journal, v19, n11, p.18(13), Oct. 1994.*

Hagjmann, Concurrency Within DOE Object Implementations, Version 0.91, May 1993.*

OMG, Common Object Request Broker: Architecture and Specification, Revision 1.1, Dec. 1991.*

Okamura et al., "Object Migration in Distributed Reflective Programming Systems," Objective Orienting Computing II, pp. 47–54, Kindaikagaku Co., Ltd., Apr. 10, 1994.

Okamura et al., "AL–1/D: A Distributed Programming System with Reflective Facilities," Objective Orienting Computing I, pp. 1–16, Kindaikagaku Co., Ltd., Jul. 1, 1993.

Shrivastava, S.K. and McCue, D.L., "Structuring Fault–Tolerant Object Systems for Modularity in a Distributed Environment," IEEE TRANSACTIONS ON PARALLEL AND DISTRIBUTED SYSTEMS, vol. 5, No. 4, pp. 421–432 (Apr. 1994).

* cited by examiner

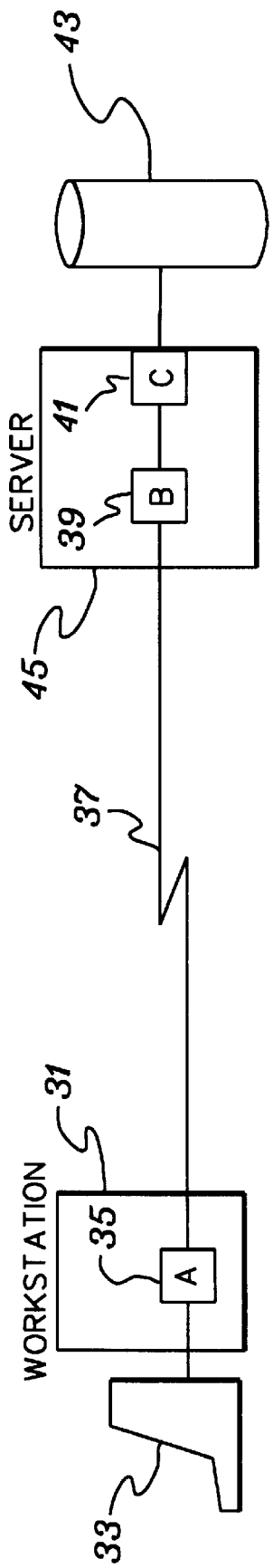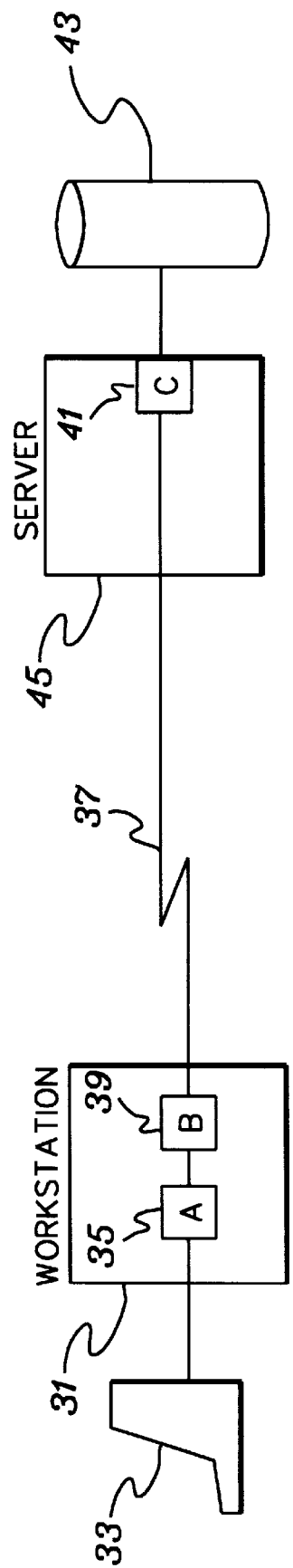

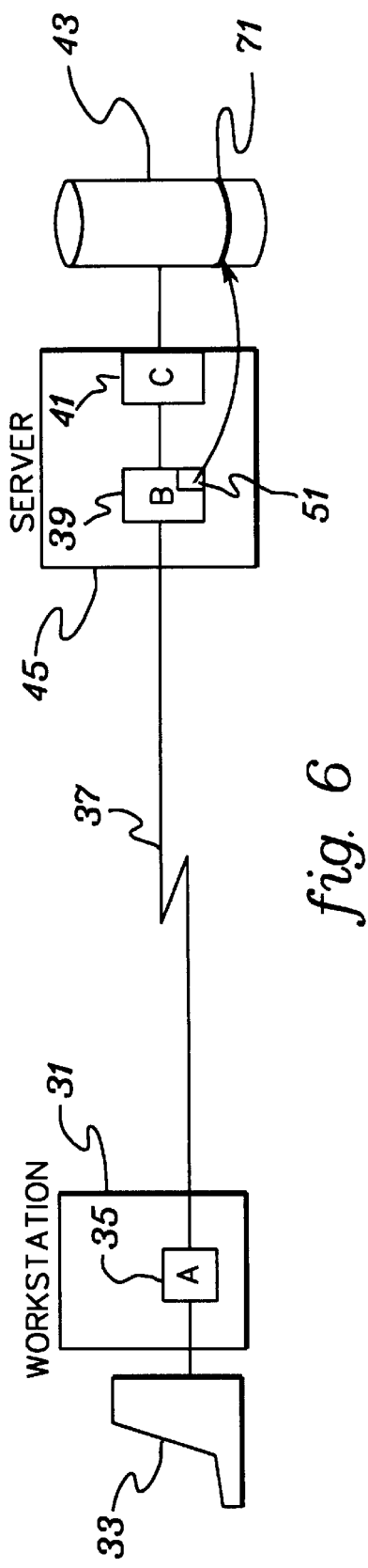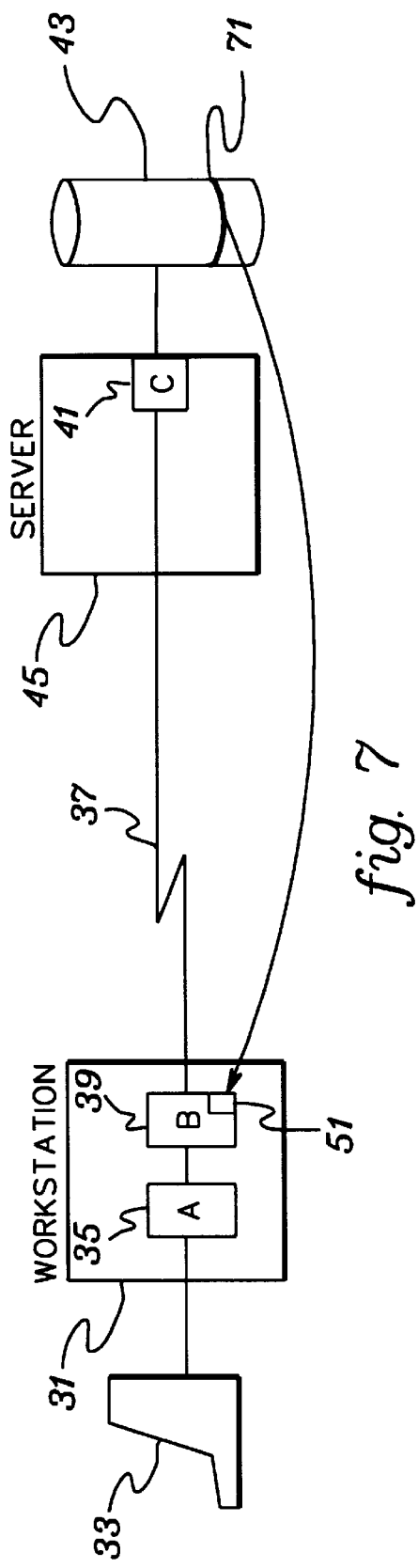

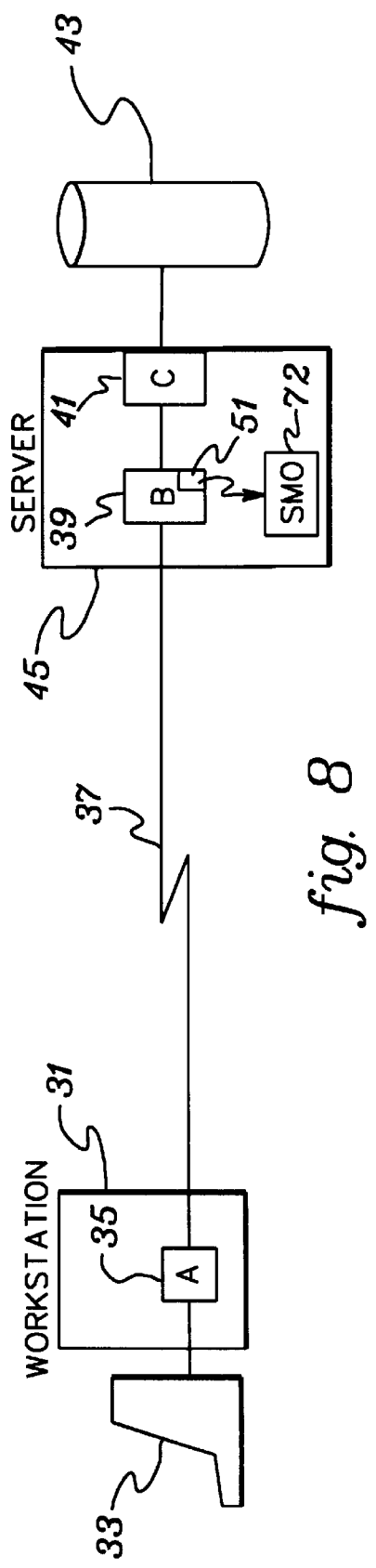
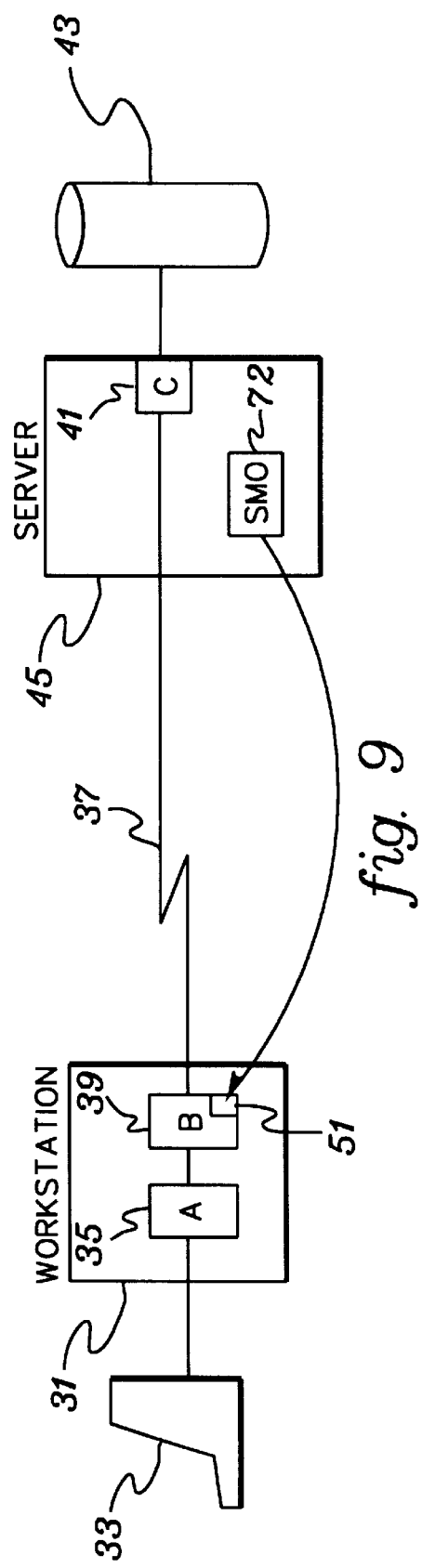

DATA FORMAT TABLE (DFT)

| TYPE | S/390 | INTEL | MOTOROLA |
|---|---|---|---|
| CHAR | EBCDIC | ASCII | ASCII |
| BOOLEAN | LOW-BIT | HIGH-BIT | LOW-BIT |
| TWO-BYTE INT | HI-LOW | LOW-HI | HI-LOW |
| ⋮ | ⋮ | ⋮ | ⋮ |

*fig. 12A*

SYSTEM CONFIG TABLE (SCT)

| SYSTEM NAME | SYSTEM PROCESSOR |
|---|---|
| SERVER | S/390 |
| WORKSTATION | INTEL-486 |

*fig. 12B*

SERVER MEMORY MAP ⟵ 62

| SYMBOL | OFFSET | LENGTH | TYPE |
|--------|--------|--------|------|
| COUNT | DOBA | 10 | STATIC-INT |
| ⋮ | ⋮ | ⋮ | ⋮ |

*fig. 13*

WORKSTATION MEMORY MAP ⟵ 64

| SYMBOL | OFFSET | LENGTH | TYPE |
|--------|--------|--------|------|
| COUNT | A0200 | 10 | STATIC-INT |
| ⋮ | ⋮ | ⋮ | ⋮ |

*fig. 14*

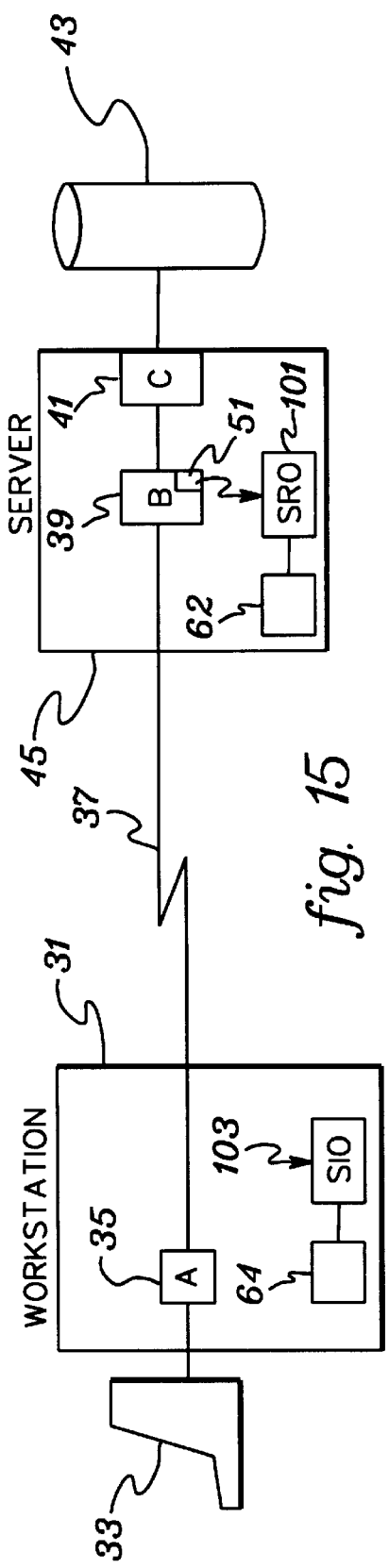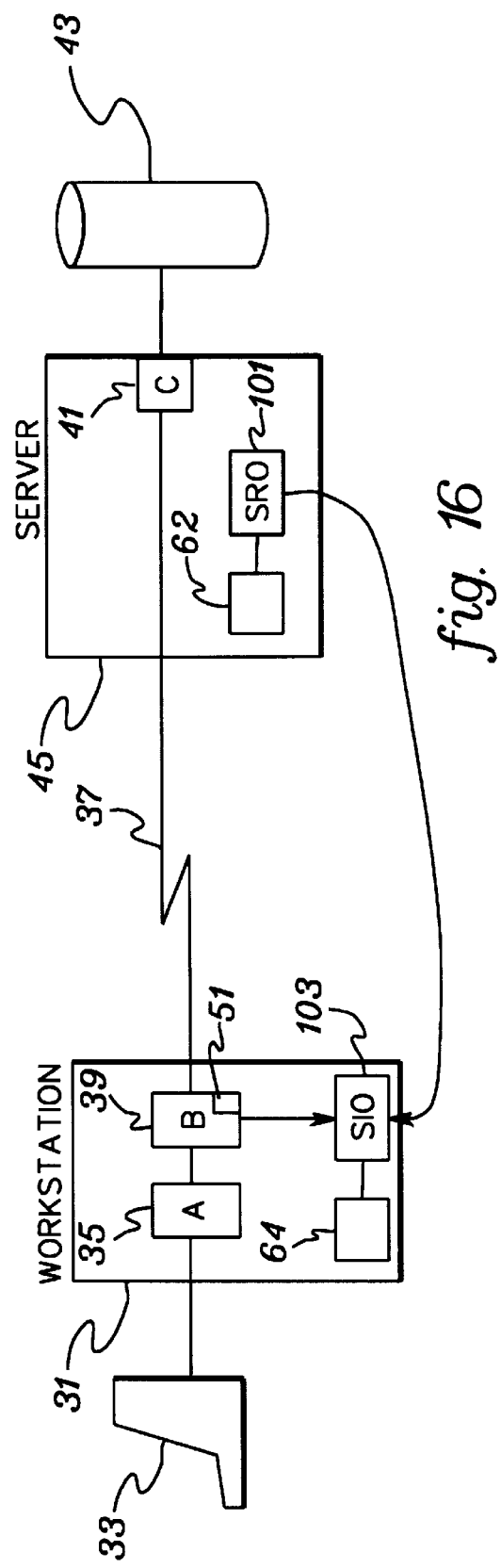

METHOD AND SYSTEM OF DYNAMICALLY MOVING OBJECTS BETWEEN HETEROGENEOUS EXECUTION ENVIRONMENTS

CROSS REFERENCE TO RELATED PATENT APPLICATIONS

The present Patent Application relates to the following commonly owned and concurrently or previously filed U.S. Patent Applications:

"METHOD AND SYSTEM FOR RUNTIME OBJECT INSTANCE MANAGEMENT," Ser. No. 08/579,542, filed herewith on Dec. 27, 1995.

"METHOD AND SYSTEM FOR MIGRATING AN OBJECT BETWEEN A SPLIT STATUS AND A MERGED STATUS," Ser. No. 08/579,544, filed herewith on Dec. 27, 1995.

The above referenced U.S. Patent Applications are hereby expressly incorporated by reference herein in their entireties.

TECHNICAL FIELD

The present invention relates in general to object-oriented computer systems. More specifically, the present invention relates to a method and system for moving objects between heterogeneous execution environments of object-oriented computer systems.

BACKGROUND OF THE INVENTION

Current computer programming techniques include the use of Object-Oriented Programming ("OOP"). Object-Oriented Programming centers on reusable, self-contained, callable program code modules known in the art as "objects." Such a modular approach makes software development more efficient and reliable through the use and reuse of proven, tested objects.

Each object is designed to accomplish a predefined set of operations through "methods" (which are also referred to herein as "functions"). These methods include programmed tasks for the object to perform when called upon to do so (i.e., invoked). Each particular method is defined within a "class" associated with an object. The class acts as a template that describes the behaviour of a group of similar objects. An object is instantiated from (or is a runtime instance of) a selected class, and includes methods and attributes (or data) defined in the class.

Although object-oriented computer systems may include heterogeneous execution environments, several limitations apply thereto. For example, once an object is instantiated within a particular execution environment, it is bound to execution therein. Little or no conventional mechanism exists for moving the object between different heterogeneous execution environments at runtime.

Further, an object may include internal values and data that accumulate as the object is repeatedly invoked, and are referred to as the object's "state." This state is bound to the particular instantiation of the object in the current execution environment. Therefore, an object is further bound to its particular instantiation in the current execution environment since conventional techniques do not permit the transfer of the objects "state" between execution environments.

The present invention is directed toward solutions for the above noted problems.

SUMMARY OF THE INVENTION

In a first aspect, the present invention operates in a heterogeneous, object-oriented computer system that includes a first execution environment and a second execution environment. In particular, the first execution environment is different from the second execution environment.

The invention includes a method of managing an object at runtime and includes identifying, at runtime, the object executing within the first execution environment. The object performs a predefined function in the first execution environment; however, performing the predefined function using the second execution environment is desirable. Runtime usage of the object executing within the first execution environment is terminated, and the object is instantiated within the second execution environment. Accordingly, the object facilitates performance of the predefined function using the second execution environment.

As an enhancement, the object may have a state that includes at least one variable maintained between invocations of the object. The method may further includes maintaining the state of the object during the terminating and the instantiating. In particular, the maintaining may include saving the state of the object before terminating usage of the object within the first execution environment, and restoring the state of the object after instantiating the object within the second execution environment. The saving and the restoring of the state of the object may be performed by at least one function of the object. In one example, the computer system may include a state management object that manages saved states of objects. The at least one function of the object may then invoke the state management object during the saving and the restoring of the state of the object.

As a further enhancement, the saving and the restoring of the state of the object may include accessing, external to the object, at least one memory location corresponding to the at least one variable that the state of the object is contained within. In support of the foregoing, the method may include generating at least one memory map that indicates the at least one variable corresponding to the at least one memory location. The accessing may then include using the at least one memory map to determine the at least one memory location corresponding to the at least one variable that the state of the object is contained within.

The state of the object may include at least one variable data type. Further, the first execution environment may maintain the at least one variable data type in a first format, and the second execution environment may maintain the at least one variable data type in a second format. In view of the foregoing, and as yet another enhancement of the present invention, the method may include, after saving the state, converting the state from the first format to the second format to facilitate restoring the state to the second execution environment.

A system corresponding to the above-disclosed method is also presented herein.

The techniques of the present invention have many advantages and features associated therewith. Runtime adaptability and flexibility are facilitated by the ability to move objects between execution environments, despite the heterogeneity thereof. Thus, an object can be moved to a faster execution environment to increase its capacity, or it can be moved off a failing, or soon-to-be unavailable system, to preserve availability of the object. Furthermore, the disclosed techniques preserve the object's state, when it is moved. This preservation is performed regardless of different variable formats that the execution environments the objects are moved between may have. Advantageously, the object has the benefit of its accumulated state information established when in the original execution environment, even when moved into another, heterogeneous execution environment. Thus, the techniques of the present invention advance the art of runtime object management in object-oriented computer systems.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIG. 2 depicts one example of a computer system that includes two execution environments with objects distributed therethrough pursuant to an embodiment of the present invention;

FIG. 3 depicts the computer system of FIG. 2 after the movement of an object between the execution environments according to one embodiment of the present invention;

FIGS. 6–9 depict examples of the saving and restoring of an object's state in conformance with embodiments of the present invention;

FIG. 12A depicts one example of a data format table ("DFT") used in converting variable types in accordance with an embodiment of the present invention;

FIG. 12B depicts an example of a system configuration table ("SCT") used in converting variable types, according to one embodiment of the present invention;

FIGS. 13–14 depict example memory maps of state variables used by an object in different execution environments pursuant to one embodiment of the present invention;

FIGS. 15–16 depict an example of saving and restoring the state of an object, using a state retrieved object ("SRO") and a state impression object ("SIO"), in accordance with an embodiment of the present invention.

DETAILED DESCRIPTION OF A PREFERRED EMBODIMENT

Figure 1:
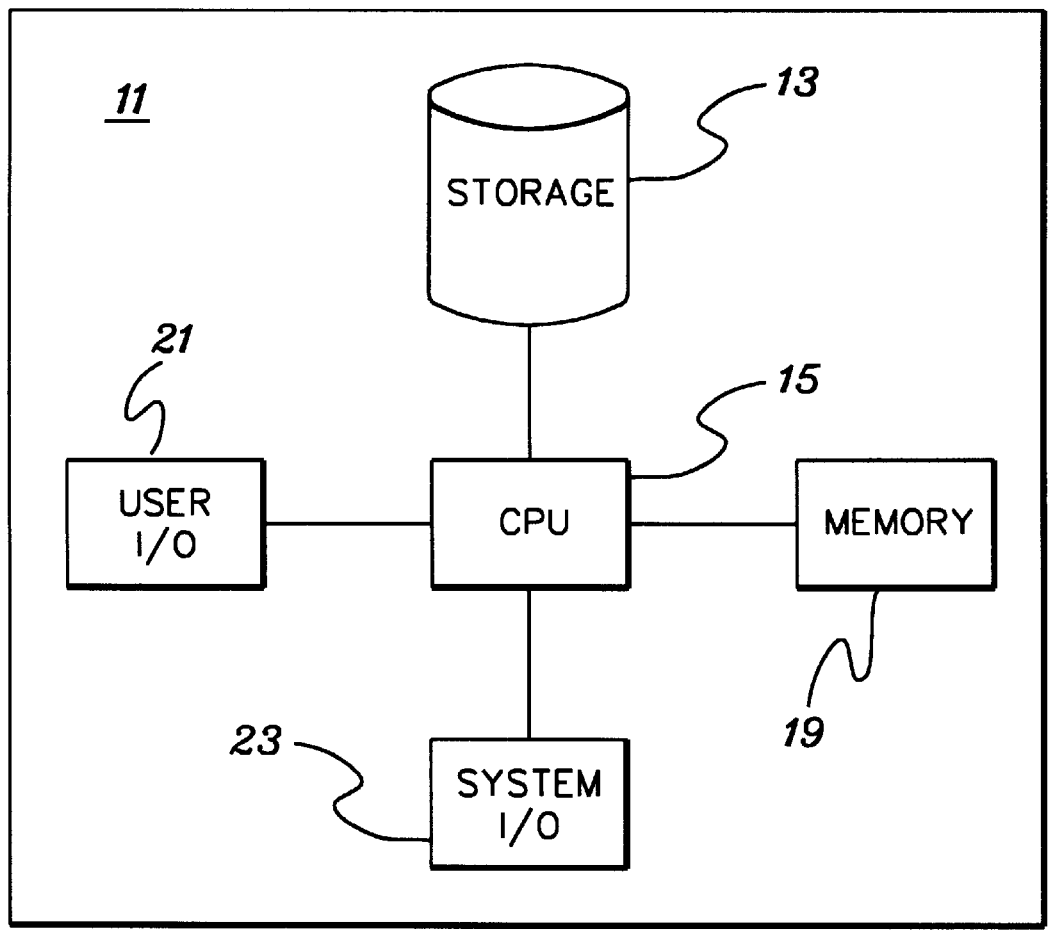
FIG. 1 depicts one example of a computer system useful in implementing embodiments of the present invention.

The techniques disclosed herein enable the runtime movement of objects between heterogeneous execution environments. This movement is accompanied by the maintenance of a moved object's state. Thus, when the moved object is invoked on the system it was moved to, subsequent invocations have the benefit of the object's state accumulated from prior invocations of the object on the system from which the object was moved. Further, the heterogeneity of the execution environments that the object is moved between is accounted for by the techniques of the present invention. Maintenance of the object's state between heterogeneous execution environments is facilitated by converting, between execution environments, the format of variables that the object's state is stored in (i.e., "state variables"). Advantageously, the object movement techniques disclosed herein facilitate many applications including, e.g., dynamic workload balancing, system backup, and system recovery.

As used herein, the term "execution environment" is defined as the combination of hardware and software that supports an executing program (e.g., an object). A program will only properly execute within a specific execution environment if it is compiled for that execution environment. As examples, different execution environments include, e.g., an "IBM" mainframe computer executing a Multiple Virtual Storage ("MVS") operating system, an "IBM" mainframe computer executing a Virtual Machine ("VM") operating system, an "INTEL" processor based personal computer executing an "IBM OS/2 WARP" operating system, an "INTEL" processor based personal computer executing a "MICROSOFT WINDOWS 95" operating system, and a "POWER PC" based computer executing a "UNIX" operating system. One of ordinary skill in the art will understand that, for a computer program to run in a native mode (i.e., no-emulation), within a given execution environment, the program must be specifically compiled for that execution environment.

The techniques disclosed herein are described in connection with terminology and resources that will be apparent to one of ordinary skill in the art. In one example, the terminology and resources described herein are associated with the Common Object Request Broker Architecture ("CORBA"—a registered trademark of the Object Management Group, Inc.), an international standard for object management resources. One example of an entity included in CORBA type systems is an Object Request Broker ("ORB"), which is responsible for, e.g., creation, deletion and tracking of objects. A particular implementation of the CORBA standard is System Object Model ("SOM") Objects Toolkit ("SOMobjects") from "IBM CORP.". Further descriptions of CORBA and SoMobjects may be found in, e.g., "CORBA—A Guide To Common Object Request Broker Architecture," by Ron Ben-Natan, McGraw-Hill, 1995 and "AIX Version 4.1 SOMobjects Base Toolkit User's Guide," IBM, 1993, Publication No. SC23-2680-01, and "AIX Version 4.1 SOMobjects Base Toolkit Programmers Reference Manual," IBM 1993, Publication No. SC23-2681-01, which are incorporated herein by reference in their entireties. CORBA is only one example of an object oriented environment within which the techniques disclosed herein will operate. The present invention is compatible with any object-oriented environment that includes an object manager (e.g., The Object Request Broker-ORB of CORBA) which enables transmittal of information between objects and provides object transparency (e.g., "Microsoft's Common Object Manager" environment or "Visual Age" environment from "IBM CORP.").

One example of the hardware elements of a computer system used to implement the techniques of the present invention are shown in FIG. 1. A central processing unit ("CPU") 15 provides main processing functionality. A memory 19 is coupled to CPU 15 for providing operational storage of programs and data. Memory 19 may include, for example, random access memory ("RAM") or read only memory ("ROM"). Nonvolatile storage of, for example, data files and programs is provided by a storage 13 that may include, for example, disk storage. Both memory 19 and storage 13 are computer usable media that may store computer program products as computer readable program code. User input and output are provided by a user input/output ("I/O") facility 21. User I/O facility 21 may include, for example, a graphical display, a mouse and/or a graphics tablet. System input and output are provided by a system I/O facility 23 (e.g., a network adapter). As will be understood in the art, other I/O facilities may be included based upon system configuration (e.g., between storage 13 and CPU 15). As one computer system example, the computer system of FIG. 1 may be an "Aptiva Personal Computer System" executing an "OS/2 Warp" operating system, from "IBM CORP.".

The techniques of the present invention enable the movement of an object between heterogeneous execution environments. As one example, FIG. 2 depicts a computer system that includes two different (i.e., heterogeneous) execution environments, namely, e.g., an "INTEL i486" PC-based workstation 31 and an "IBM System/390" class mainframe-based server 45. A network connection 37 interconnects workstation 31 and server 45 to facilitate communication therebetween. Workstation 31 is designed to interact with a user through a graphical user terminal 33 (e.g., a monitor, mouse and keyboard), while server 45 is intended as a database server that accesses stored information on, e.g., a disk 43.

Both server 45 and workstation 31 are object-oriented computing environments. A database related object C 41 executes in server 45, and a graphical user interface related object A 35 executes in workstation 31. An object B 39 performs a function that does not necessarily have to execute on either workstation 31 or server 45 (i.e., it is not intimately tied to either a disk or graphical interface). For example, object B 39 could perform a numerical computation based on data received from object C 41. In the environment depicted in FIG. 2, object B 39 executes in server 45.

In response to system conditions, it may become desirable (or even necessary) to terminate object B's 39 execution on server 45, and move object B 39 to workstation 31 as shown in FIG. 3. For example, the movement of object B 39 from server 45 to workstation 31 may be precipitated by server 45 becoming too busy to service object B 39 adequately. Workstation 31 may not be as busy, such that the load of object B 39 is serviceable thereon. Advantageously, the present invention enables the movement of object B 39 between the heterogeneous execution environments, e.g., server 45 and workstation 31, while maintaining the object's state.

Figure 4:
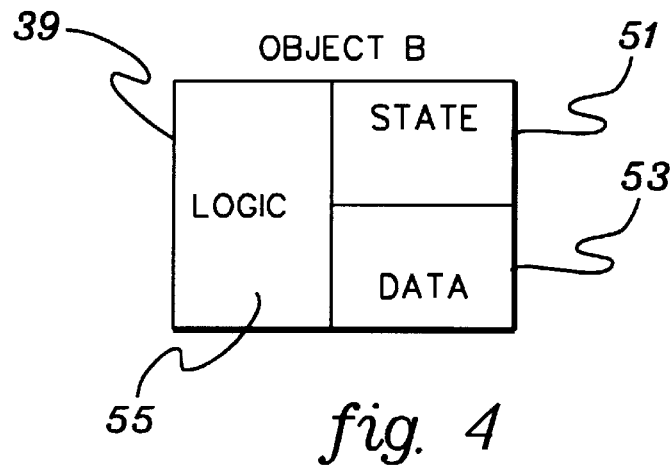
FIG. 4 depicts an example of an object, and the multiple parts thereof, in accordance with an embodiment of the present invention.

By way of further explanation, regarding the object's state and object's contents in general, object B 39 is shown in greater detail in FIG. 4 and includes logic 55, state 51 and data 53. Logic 55 includes the methods that the object implements (also referred to herein as "functions"). Data 53 includes variables used by the object that are not maintained between object invocations. For example, values passed to an object upon the invocation thereof, and discarded upon the completion of processing, may be stored in data 53. State 51 includes variables (i.e., "state variables") that persist between invocations of the object. In, e.g., a C++ programming environment, these "state variables" would be defined as, e.g., "static" types.

Figure 5:
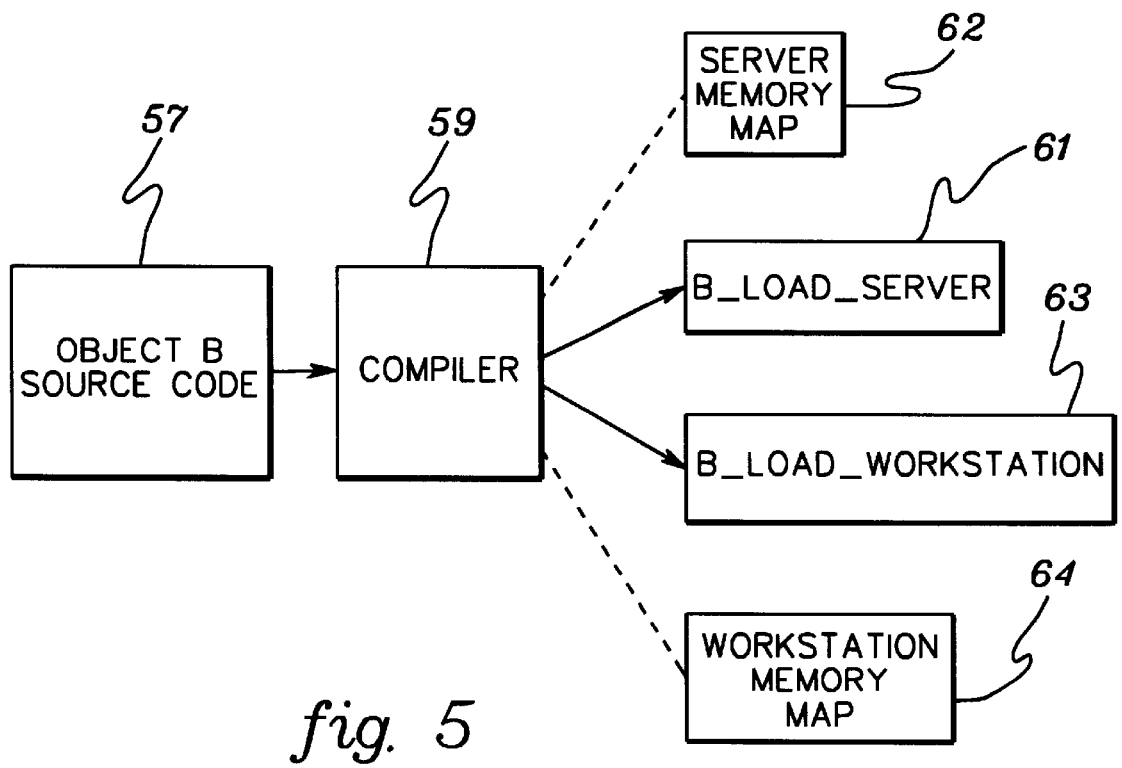
FIG. 5 depicts one example of compiling an object for different execution environments pursuant to one embodiment of the present invention.

To enable the operation of object B 39 within heterogeneous execution environments (e.g., server 45 and workstation 31), executable versions (i.e., loadable modules) of object B 39 are created for object B 39 in each potential execution environment. To further explain, and as shown in FIG. 5, source code 57 for object B 39 is provided (i.e., from the class(es) the object is instantiated from) and compiled using a compiler 59. Compiler 59 is used to produce loadable modules for object B 39 for each execution environment. A loadable module B_LOAD_SERVER 61 is produced for server 45, and a loadable module B_LOAD_WORKSTATION 63 is produced for workstation 31. Compiler 59 may be a single, selectable target compiler, or it may be multiple compilers, each corresponding to one of the desired execution environments for object B 39.

In further regard to FIG. 5, a server memory map 62 and a workstation memory map 64 are produced by compiler 59 along with the loadable modules. As will be explained hereinbelow, these memory maps indicate the locations of the variables (including the state variables) used by object B 39 within each execution environment. In some embodiments disclosed herein, the memory maps are used in connection with the preservation of object B's state during movement thereof between execution environments.

The memory maps and loadable modules of FIG. 5 will be discussed further below with respect to processes within which they are used.

Figure 10:
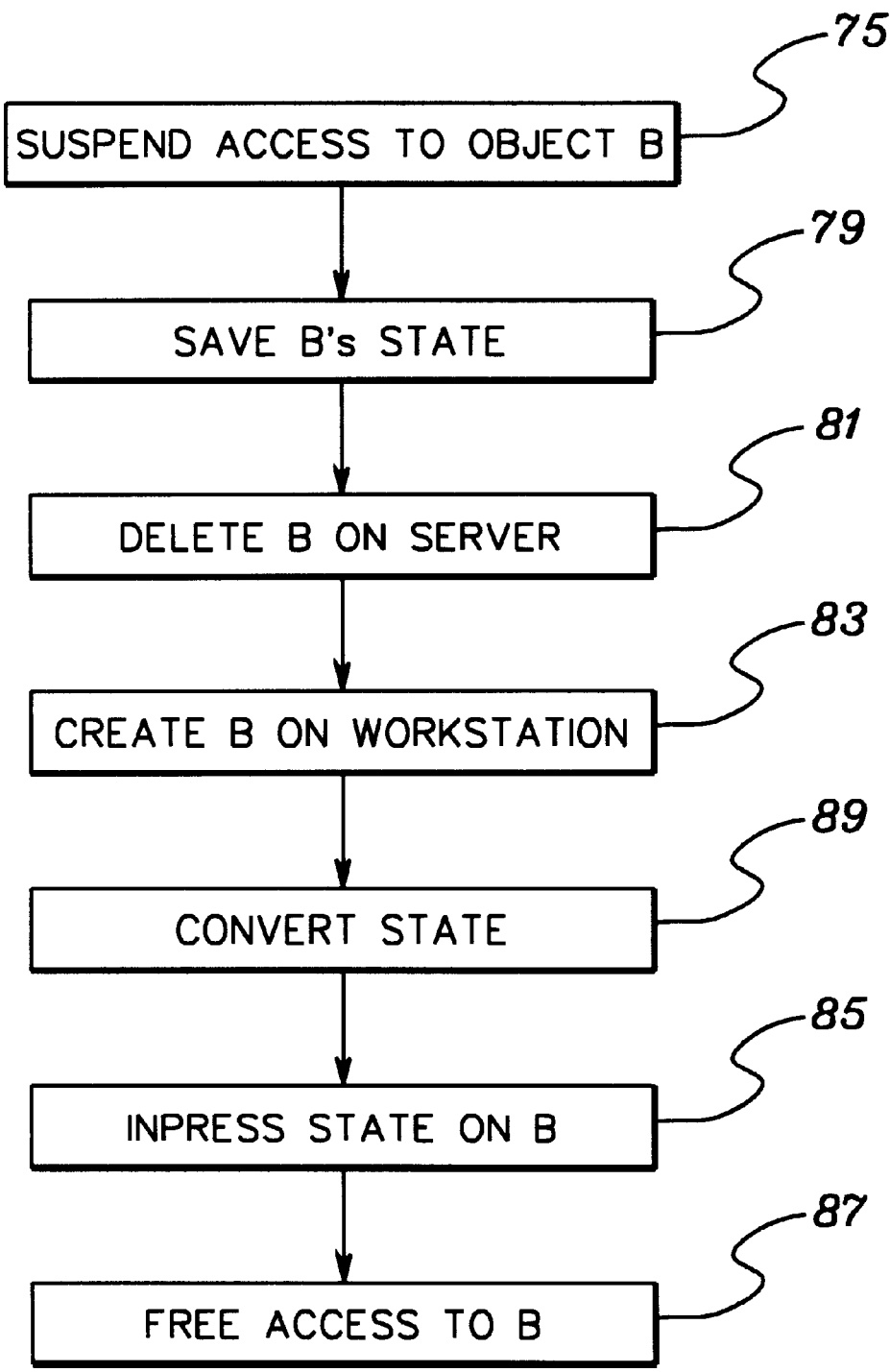
FIG. 10 is a flow-diagram of one example of a process for moving an object between execution environments according to an embodiment of the present invention.

Shown in FIG. 10 is a flow-diagram of one process for moving an object from a first execution environment (e.g., server 45) to a second execution environment (e.g., workstation 31). The process begins by suspending access within the computer system to object B (STEP 75). In, e.g., an "MVS" ("Multiple Virtual Storage") operating system, this suspending of access is performable using an exclusive ENQ ("Enqueue") system macro. Thereafter, the state of object B is saved (STEP 79—this step, along with restoring of an object's state, will be described in further detail hereinbelow). After the state of object B has been saved, object B may be deleted using conventional techniques (STEP 81).

Object B is next created on workstation 31 (STEP 83). This creation is performed using conventional CORBA processing which is facilitated by the creation of the B_LOAD_WORKSTATION 63 loadable module described hereinabove. As previously discussed, when initially created in this manner, object B's state is reinitialized such that all state information accumulated while object B executed on server 45 is lost. However, according to the techniques of the present invention, this state information is recovered.

One step in the recovery of object B's state may include the conversion of state data from the format it was stored in on server 45 to a format compatible with workstation 31 (STEP 89—this step is described further hereinbelow). Thereafter, the properly formatted state is impressed into object B (STEP 85) and access to object B from the computer system is then permitted (STEP 87). In, e.g., an IBM MVS ("Multiple Virtual Storage") operating system, permitting access is performable using a DEQ ("Dequeue") system macro.

The saving (STEP 79 above) and restoring (STEP 89 above) of an object's state is performable according to multiple embodiments of the present invention. As a first example, reference is made to the embodiment shown in the system diagrams of FIGS. 6 and 7. In this embodiment, internal methods within object B 39 are used to save and restore state 51 of object B 39 (e.g., a save state method and a restore state method). These methods are defined in the class (or classes) that object B 39 is instantiated from such that they are included within object B 39 despite the particular execution environment for which it is compiled.

As shown in FIG. 6, the save state method of object B 39 writes state 51 to file 71 (i.e., a dataset) within disk 43. This writing may be implemented by writing the contents of each state variable, in, e.g., an ASCII ("American National Standard Code for Information Exchange") format to predesignated file 71 on disk 43 (e.g., using a high-level language formatted output command). Conversely, as shown in Pig. 7, object B's 39 state 51 is restored once object B 39 has been instantiated on workstation 31. Specifically, object B's 39 state 51 is read from file 71 stored on disk 43. It is assumed that both computers have access to file 71 through, e.g., network connection 37 and conventional networking protocols. Because all state variables are written out in a standard format (e.g., ASCII), conversion between the format in which each computer (e.g., workstation 31 and server 45) internally stores variable values is inherent. The individual steps for reading and writing variable values to a disk file will be apparent to one of ordinary skill in the art in view of this disclosure.

In an alternate embodiment of the present invention, the manipulation of a particular disk file 71 by object B 39 may be unnecessary. For example, as shown in the system diagrams of FIGS. 8 and 9, state 51 is saved to, and restored from, a state management object ("SMO") 72. The variable values are sent to SMO 72 in an ASCII format, making format conversion unnecessary. SMO 72 stores the state values (either internally or externally) until they are read by the restore state method of object B 39. Implementation of this embodiment is facilitated by the object management functions inherent in, e.g., the CORBA environment. For example, to save object B's 39 state, a receive state method within SMO 72 is invoked by the save state method of object B 39 (through conventional, e.g., ORB processing) and passed the ASCII representation of object B's 39 state variables. Conversely, restoring object B's 39 state is performed by the restore state method in object B 39 invoking, e.g., a transmit stored state method in SMO 72. Again, the individual steps for the invocation and passing of data between objects is conventional in object-oriented computing systems such as, for example, a CORBA based computing system. The individual programming steps used in the implementation of SMO 72 and its receive state and transmit stored state methods will be apparent to one of ordinary skill in the art in view of this disclosure.

In each of the above examples, internal methods within object B 39 are involved in the saving and restoring of the state of object B 39. However, according to the techniques of the present invention, saving and restoring object B's 39 state can be performed without utilizing methods internal to object B 39.

The methods for retrieving and impressing an object's state, by steps performed external to the object, utilize memory maps created upon object compilation (e.g., FIG. 5, server memory map 62 and workstation memory map 64). An example server memory map 62 for object B 39 is shown in FIG. 13, while an example workstation memory map 64 for object B 39 is shown in FIG. 14. In each of these memory maps, an example section corresponding to a state variable "count" is shown. As depicted, within server memory map 62, the variable designated by the symbol "count" is stored at a position designated by offset DOBA, is 10 bytes long, and is of a static integer type. The static designation is important because this indicates that the variable "count" survives invocations of object B 39 and is thus a "state variable." On workstation 31, the state variable "count" is located at an offset in memory of A0200 has a length of 10 and is also stored as a static integer. Utilizing these memory maps, a program (e.g., object) external to object B 39 can access the memory corresponding to object B 39, such that object B's 39 state variables can be both extracted and impressed.

In the embodiment shown in FIGS. 15 and 16, server memory map 62 is available within server 45, and workstation memory map 64 is available within workstation 31. A state retrieval object ("SRO") 101 is instantiated within server 45 for utilizing server memory map 62 to retrieve the state 51 of object B 39 (FIG. 15). Conversely, a state impression object ("SIO") 103 is instantiated within workstation 31 for utilizing workstation memory map 64 to impress values into state 51 of object B 39 (FIG. 16).

Figure 17:
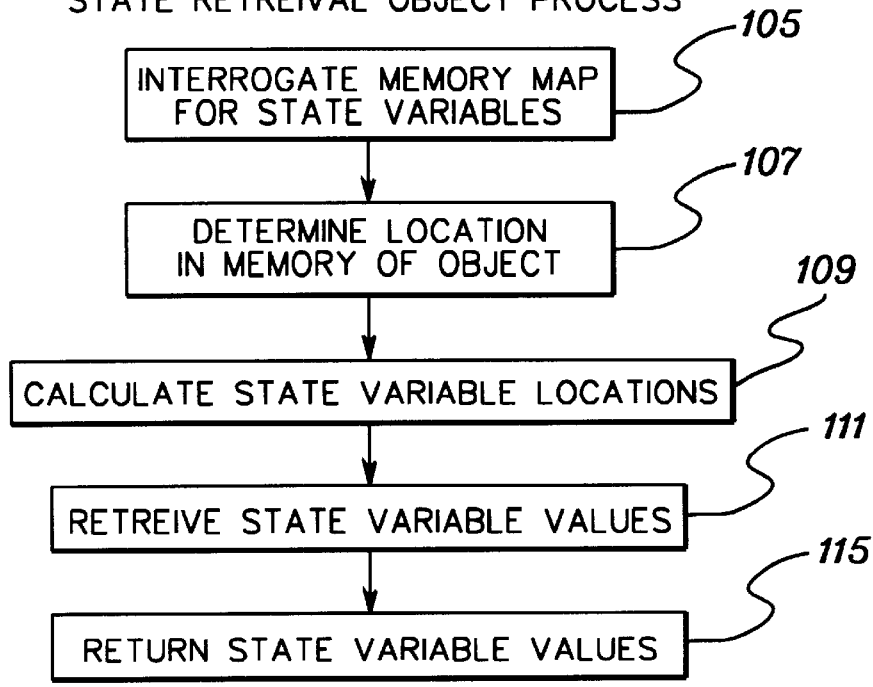
FIGS. 17–18 depict flow-diagrams of examples of a state retrieval object process and a state impression object process, respectively, pursuant to one embodiment of the present invention.

One example of a process that State Retrieval Object 101 uses to retrieve state 51 of object B 39 is depicted in the flow-diagram of FIG. 17. This process is described regarding the system configuration shown in FIGS. 15 and 16. After its invocation, a first step that SRO 101 performs is to interrogate server memory map 62 for state variables (STEP 105). These are indicated by the variable type field in the memory map, and, e.g., in a C++ environment, state variables will have a "static" type definition. Thereafter, the memory offset for each of the state variables is determined from server memory map 62. As will be understood by one of ordinary skill in the art, each offset is from a starting location of object B 39 within the server's 45 memory. This starting location is determined by querying a task manager of server 45 using conventional processing (STEP 107). By summing the starting location and each offset, the exact location of each state variable within the memory of server 45 is determined (STEP 109).

Using the calculated memory location for each state variable, and the length of each variable indicated in server memory map 62, the value of each state variable value is retrieved from within the memory of server 45 (STEP 111). After that, the state variable values are returned to the invoker of SRO 101 (STEP 115—, i.e., returned to the process performing the object move). Each state variable name is returned along with the retrieved value, and optionally, the variable type may also be returned to facilitate conversion of the state variable format between execution environments.

Once the state variable values have been retrieved from the object being moved, they can be impressed on the object after its instantiation in the execution environment to which it is being moved, prior to the object's use. An example of a process used to impress a stored state value into an object is depicted in the flow-diagram of FIG. 18 and is described regarding the movement of object B 39 shown in the system diagram of FIG. 16.

Figure 18:
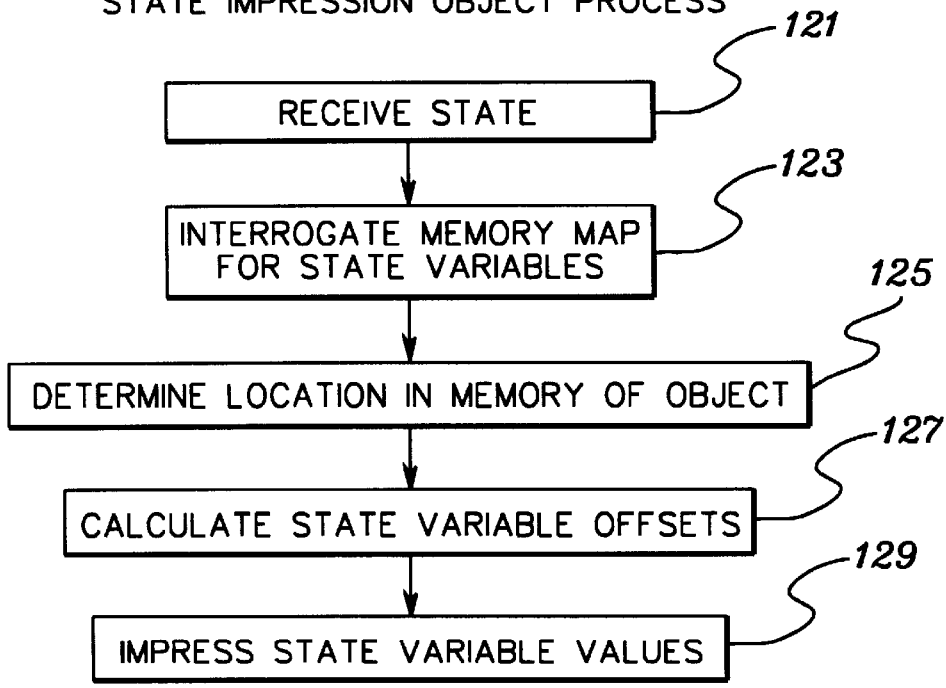

A first step in the process depicted in FIG. 18 includes passing State Impression Object ("SIO") 103 the state variable values previously retrieved from object B 39 while it executed within server 45 (STEP 121). SIO 103 then parses workstation memory map 64 to locate each of the state variables that it was passed (STEP 123). There should be a one-to-one correspondence between the state variable values it was passed and the state variables in workstation memory map 64 because despite which system object B 39 is instantiated on, it is invoked from the same class(es) having the same state (i.e., invocation persistent) variables.

As a next step, the exact location of each state variable in the memory of workstation 31 is determined. To that end, the starting location of object B 39 within the memory of workstation 31 is determined (STEP 125—, e.g., through a task manager), and the offset values in workstation memory map 64 are used to determine the exact memory location of each state variable (STEP 127) within the memory of workstation 31. After that, the state variable values are impressed into object B 39 by writing the state variable values into their corresponding locations within the memory of workstation 31 (STEP 129).

The techniques disclosed above concerning FIGS. 13–18 assume that the format of each state variable is identical in the execution environments that the object is moved between. However, this may not always be true. Heterogeneous execution environments may store the same variable types in dissimilar formats. For example, byte ordering, string encoding, and sign representation may all vary for a same variable type stored in different execution environments. The techniques of the present invention account for these different variable formats by providing automatic conversion therebetween.

Depicted in FIGS. 12A and 12B, respectively, is a Data Format Table ("DFT") and a System Configuration Table ("SCT") used in converting variable formats. The DFT (FIG. 12A) stores each type of variable along with the format it is stored in by each type of processor that may be used in an execution environment within the current computer system. For example, character ("CHAR" ) type variables are stored in EBCDIC format on IBM System/390 type processors, and are stored in ASCII format on "INTEL" and "Motorola" processors.

The SCT (FIG. 12B) contains the system name of each execution environment and the type of processor corresponding thereto. The type of processor for any of the execution environments of the current computer system can therefore be determined using the SCT, and then applied in connection with the DFT.

The process for converting variable formats between different execution environments begins after the state variable values for the subject object have been read therefrom. For example, regarding FIG. 15, after the state variable values of object B 39 have been read from the memory of server 45, the state variables are converted to a format compatible with workstation 31.

Figure 11:
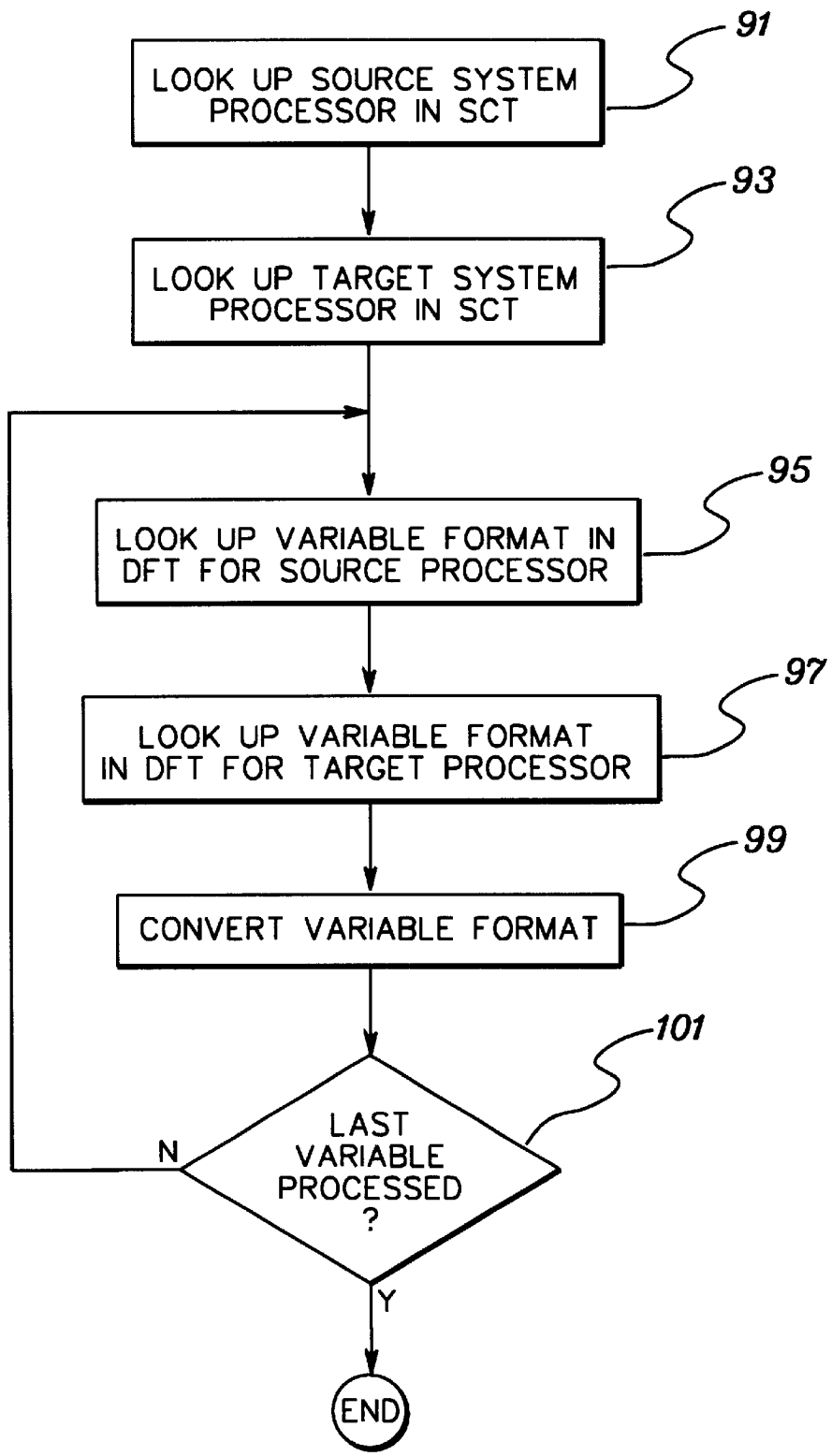
FIG. 11 is a flow-diagram of an example process for converting variable types within an object's state between execution environments pursuant to one embodiment of the present invention.

One example of a process for converting variable formats is depicted in FIG. 11, and begins with the determination of the processor types for the execution environments between which the object is being moved. The name of the execution environment that the object is being moved from (i.e., the "source system") is looked-up in the SCT (STEP 91), and the corresponding processor is determined therefrom. Similarly, the name of the execution environment that the object is being moved to (i.e., the "target system") is looked-up in the SCT (STEP 93), and the corresponding processor is determined therefrom. For example, the workstation 31 of FIG. 15 is looked-up in the SCT of FIG. 12B as an execution environment called "workstation," and it is thereby determined that workstation 31 uses an Intel i486 type processor. The server 45 of FIG. 15 is looked-up in the SCT of FIG. 12B as an execution environment called "server," and it is thereby determined that server 45 uses an IBM System/390 series processor.

After the determination of the processor types for each execution environment, the format of the state variable values may be converted between the source and target execution environments. As an example, the "count" variable (see, e.g., FIGS. 13 & 14) will be converted between server 45 and workstation 31. The source execution environment processor type (i.e., S/390) and type of "count" variable (i.e., two-byte integer) is used to look up the corresponding variable format in the DFT (FIG. 11—STEP 95 & the DFT of FIG. 12A). In this example, a format of HI-LOW is determined, and means that two-byte integers are stored with the high (i.e., most significant) byte first. Also, the target execution environment processor type (i.e., "INTEL") and type of count variable (i.e., integer) is used to look up the corresponding variable format in the DFT (STEP 97). In this example, a format of LOW-HI is determined, and means that two-byte integers are stored with the low (i.e., least significant) byte first.

To continue, the variable value for count is next converted (STEP 99) from its current integer-S/390 format to the integer-"INTEL" format for storage on workstation 31. Using the determined formats from the DFT, an appropriate conversion function is used to convert the variable format. The individual steps of such conversions will be apparent to one of ordinary skill in the art. In the current example, the high and low bytes of the stored integer count value are swapped to convert between execution environment formats (i.e., HI-LOW format to LOW-HI format). The above described process is repeated for each state variable (STEP 101) such that conversion of the entire state of object B 39 is completed.

The techniques disclosed herein are advantageously useful in various applications. As one example, in a workload balancing application, objects may be moved between heterogeneous execution environments to manage the workload of a computing system. In another application, the techniques of the present invention can be used to move all objects off a designated execution environment, while maintaining the state of each object. For example, if the electrical power to the physical location of an execution environment failed, a back-up power supply would typically take over, but have a limited life. Upon detection of a switch-over to backup power, the objects of the execution environment could be migrated to other execution environments in the computing system (e.g., network attached systems that are located remotely, at powered locations). Beneficially, all objects would be maintained along with their accumulated states.

The techniques of the present invention have many advantages and features associated therewith. Runtime adaptability and flexibility are facilitated by the ability to move objects between execution environments, despite the heterogeneity thereof. Thus, an object can be moved to a faster execution environment to increase its capacity, or it can be moved off a failing, or soon-to-be unavailable system, to preserve availability of the object. Furthermore, the disclosed techniques preserve the object's state, when it is moved. This preservation is performed despite different variable formats that the execution environments the object is moved between may have. Advantageously, the object has the benefit of its accumulated state information established when in the original execution environment, even when moved into another, heterogeneous execution environment. Thus, the techniques of the present invention advance the art of runtime object management in object-oriented computer systems.

Described above are examples of techniques for moving objects between heterogeneous execution environments. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. In a heterogeneous computer system including a first execution environment comprising a first operating system and a second execution environment comprising a second operating system, said first execution environment being different from said second execution environment, a method of managing an object at runtime, said method comprising:

(a) identifying, at runtime, said object executing within said first execution environment directly on said first operating system;

(b) terminating usage of said object executing within said first execution environment, at runtime; and (c) instantiating said object within said second execution environment directly on said second operating system, at runtime, wherein said first execution environment and said second execution environment are heterogeneous in hardware, and wherein said first operating system and said second operating system are different.

2. The method of claim 1, wherein said object has a state, said state including at least one variable that is maintained between invocations of said object, and wherein said method further includes maintaining said state of said object during said terminating and said instantiating.

3. The method of claim 2, wherein said maintaining includes saving said state of said object prior to said terminating usage of said object within said first execution environment, and restoring said state of said object after said instantiating said object within said second execution environment.

4. The method of claim 3, wherein said saving and said restoring of said state of said object is performed by at least one function of said object.

5. The method of claim 4, wherein said object includes a save state function, and wherein said saving of said state includes calling for execution of said save state function.

6. The method of claim 5, wherein said computer system includes a state storage area, and wherein said save state function copies said state of said object to said state storage area.

7. The method of claim 4, wherein said object includes a restore state function, and wherein said restoring of said state of said object includes calling for execution of said restore state function.

8. The method of claim 7, wherein said computer system includes a state storage area, and wherein said restore state function retrieves said state of said object from said state storage area.

9. The method of claim 4, wherein said computer system includes a state management object that manages saved states of objects, and wherein said at least one function of said object invokes said state management object during said saving and said restoring of said state of said object.

10. The method of claim 3, wherein said saving and said restoring of said state of said object includes accessing, external to said object, at least one memory location corresponding to said at least one variable that said state of said object is contained within.

11. The method of claim 10, wherein said method includes generating at least one memory map, said at least one memory map indicating said at least one variable corresponding to said at least one memory location, and wherein said accessing includes using said at least one memory map to determine said at least one memory location corresponding to said at least one variable that said state of said object is contained within.

12. The method of claim 11, wherein said generating at least one memory map comprises generating a first memory map corresponding to said first execution environment, and generating a second memory map corresponding to said second execution environment, said first memory map indicating a first memory location in said first execution environment for said at least one state variable, said second memory map indicating a second memory location in said second execution environment for said at least one state variable, and wherein said saving said state includes referencing said first memory map to determine said first memory location and extracting said at least one state variable from said first memory location, and wherein said restoring said state includes referencing said second memory map to determine said second memory location and writing said at least one state variable into said second memory location.

13. The method of claim 12, wherein said generating said first memory map and said second memory map comprises compiling said object for said first execution environment and for said second execution environment using at least one compiler, wherein said at least one compiler is instructed to generate said first memory map and said second memory map.

14. The method of claim 3, wherein said state includes at least one variable data type, said first execution environment maintains said at least one variable data type in a first format, said second execution environment maintains said at least one variable data type in a second format, and wherein said method further comprises, after said saving said state, converting said state from said first format to said second format to facilitate said restoring said state to said second execution environment.

15. The method of claim 14, wherein said system includes a variable format table including multiple variable data types and multiple variable formats corresponding thereto for said first execution environment and said second execution environment, and wherein said converting includes looking up said first format and said second format in said variable format table.

16. The method of claim 15, wherein said at least one variable data type includes one of integer, floating-point, fixed-point and string.

17. The method of claim 15, wherein each of said first format and said second format include at least one of high-byte first, low-byte first, ASCII, and EBCDIC.

18. The method of claim 3, further comprising suspending invocations of said object by said object-oriented computer system prior to said saving the state of the object.

19. The method of claim 18, further comprising deleting said object from said first execution environment after said saving the state of the object.

20. The method of claim 3, further comprising resuming invocations of said object by said object-oriented computer system after said restoring the state of the object.

21. In a heterogeneous computer system including a first execution environment comprising a first operating system and a second execution environment comprising a second operating system, said first execution environment being different from said second execution environment, a system to manage an object at runtime, said system comprising:

(a) means for identifying, at runtime, said object executing within said first execution environment directly on said first operating system;
(b) means for terminating usage of said object executing within said first execution environment, at runtime; and
(c) means for instantiating said object within said second execution environment directly on said second operating system, at runtime, wherein said first execution environment and said second execution environment are heterogeneous in hardware, and wherein said first operating system and said second operating system are different.

22. The system of claim 21, wherein said object has a state, said state including at least one variable that is maintained between invocations of said object, and wherein said system further includes means for maintaining said state of said object during said terminating and said instantiating.

23. The system of claim 22, wherein said means for maintaining includes means for saving said state of said object prior to said terminating usage of said object within said first execution environment, and means for restoring said state of said object after said instantiating said object within said second execution environment.

24. The system of claim 23, wherein said means for saving and said means for restoring said state of said object include at least one function of said object.

25. The system of claim 24, wherein said object includes a save state function, and wherein said means for saving said state includes means for calling for execution of said save state function.

26. The system of claim 25, wherein said computer system includes a state storage area, and wherein said save state function includes means for copying said state of said object to said state storage area.

27. The system of claim 24, wherein said object includes a restore state function, and wherein said means for restoring said state of said object includes means for calling for execution of said restore state function.

28. The system of claim 27, wherein said computer system includes a state storage area, and wherein said restore state function includes means for retrieving said state of said object from said state storage area.

29. The system of claim 24, wherein said computer system includes a state management object that manages saved states of objects, and wherein said at least one function of said object includes means for invoking said state management object that operates in connection with said means for saving and said means for restoring said state of said object.

30. The system of claim 23, wherein said means for saving and said means for restoring said state of said object includes means for accessing, external to said object, at least one memory location corresponding to said at least one variable that said state of said object is contained within.

31. The system of claim 30, wherein said system includes means for generating at least one memory map, said at least one memory map indicating said at least one variable corresponding to said at least one memory location, and wherein said means for accessing includes means for using said at least one memory map to determine said at least one memory location corresponding to said at least one variable that said state of said object is contained within.

32. The system of claim 31, wherein said means for generating at least one memory map comprises means for generating a first memory map corresponding to said first execution environment, and means for generating a second memory map corresponding to said second execution environment, said first memory map indicating a first memory location in said first execution environment for said at least one state variable, said second memory map indicating a second memory location in said second execution environment for said at least one state variable, and wherein said means for saving said state includes means for referencing said first memory map to determine said first memory location and means for extracting said at least one state variable from said first memory location, and wherein said means for restoring said state includes means for referencing said second memory map to determine said second memory location and means for writing said at least one state variable into said second memory location.

33. The system of claim 32, wherein said means for generating said first memory map and said second memory map includes at least one compiler.

34. The system of claim 33, wherein said state includes at least one variable data type, said first execution environment includes said at least one variable data type in a first format, said second execution environment includes said at least one variable data type in a second format, and wherein said system further comprises, means for converting said state from said first format to said second format.

35. The system of claim 34, further comprising a variable format table including multiple variable data types and multiple variable formats corresponding thereto for said first execution environment and said second execution environment, and wherein said means for converting includes means for looking up said first format and said second format in said variable format table.

36. The system of claim 35, wherein said at least one variable data type includes one of integer, floating-point, fixed-point and string.

37. The system of claim 35, wherein each of said first format and said second format include at least one of high-byte first, low-byte first, ASCII, and EBCDIC.

38. The system of claim 33, further comprising means for suspending invocations of said object by said object-oriented computer system prior to said saving the state of the object.

39. The system of claim 38, further comprising means for deleting said object from said first execution environment after said saving the state of the object.

40. The system of claim 23, further comprising means for resuming invocations of said object by said object-oriented computer system after said restoring the state of the object.

41. An article of manufacture, comprising:
computer usable media having computer readable program code means embodied therein for a heterogeneous computer system including a first execution environment comprising a first operating system and a second execution environment comprising a second operating system, said first execution environment being different from said second execution environment, said code means for managing an object at runtime, and comprising:
(a) code means for identifying, at runtime, said object executing within said first execution environment directly on said first operating system;
(b) code means for terminating usage of said object executing within said first execution environment, at runtime; and
(c) code means for instantiating said object within said second execution environment directly on said second operating system, at runtime, wherein said first execution environment and said second execution environment are heterogeneous in hardware, and wherein said first operating system and said second operating system are different.

42. The article of manufacture of claim 41, wherein said object has a state, said state including at least one variable that is maintained between invocations of said object, and wherein said article of manufacture further includes code means for maintaining said state of said object during said terminating and said instantiating.

43. The article of manufacture of claim 42, wherein said code means for maintaining includes code means for saving said state of said object prior to said terminating usage of said object within said first execution environment, and code means for restoring said state of said object after said instantiating said object within said second execution environment.

44. The article of manufacture of claim 43, wherein said code means for saving and said code means for restoring said state of said object include at least one function of said object.

45. The article of manufacture of claim 44, wherein said object includes a save state function, and wherein said code means for saving said state includes code means for calling for execution of said save state function.

46. The article of manufacture of claim 45, wherein said article of manufacture includes a state storage area, and wherein said save state function includes code means for copying said state of said object to said state storage area.

47. The article of manufacture of claim 44, wherein said object includes a restore state function, and wherein said code means for restoring said state of said object includes code means for calling for execution of said restore state function.

48. The article of manufacture of claim 47, wherein said computer article of manufacture includes a state storage area, and wherein said restore state function includes code means for retrieving said state of said object from said state storage area.

49. The article of manufacture of claim 44, wherein said article of manufacture includes a state management object that manages saved states of objects, and wherein said at least one function of said object includes code means for invoking said state management object that operates in connection with said code means for saving and said code means for restoring said state of said object.

50. The article of manufacture of claim 43, wherein said code means for saving and said code means for restoring said state of said object includes code means for accessing, external to said object, at least one memory location corresponding to said at least one variable that said state of said object is contained within.

51. The article of manufacture of claim 50, wherein said article of manufacture includes code means for generating at least one memory map, said at least one memory map indicating said at least one variable corresponding to said at least one memory location, and wherein said code means for accessing includes code means for using said at least one memory map to determine said at least one memory location corresponding to said at least one variable that said state of said object is contained within.

52. The article of manufacture of claim 51, wherein said code means for generating at least one memory map comprises code means for generating a first memory map corresponding to said first execution environment, and code means for generating a second memory map corresponding to said second execution environment, said first memory map indicating a first memory location in said first execution environment for said at least one state variable, said second memory map indicating a second memory location in said second execution environment for said at least one state variable, and wherein said code means for saving said state includes code means for referencing said first memory map to determine said first memory location and means for extracting said at least one state variable from said first memory location, and wherein said means for restoring said state includes code means for referencing said second memory map to determine said second memory location and code means for writing said at least one state variable into said second memory location.

53. The article of manufacture of claim 52, wherein said code means for generating said first memory map and said second memory map includes at least one compiler.

54. The article of manufacture of claim 53, wherein said state includes at least one variable data type, said first execution environment includes said at least one variable data type in a first format, said second execution environment includes said at least one variable data type in a second format, and wherein said article of manufacture further comprises, code means for converting said state from said first format to said second format.

55. The article of manufacture of claim 54, further comprising a variable format table including multiple variable data types and multiple variable formats corresponding thereto for said first execution environment and said second execution environment, and wherein said code means for converting includes code means for looking up said first format and said second format in said variable format table.

56. The article of manufacture of claim 55, wherein said at least one variable data type includes one of integer, floating-point, fixed-point and string.

57. The article of manufacture of claim 55, wherein each of said first format and said second format include at least one of high-byte first, low-byte first, ASCII, and EBCDIC.

58. The article of manufacture of claim 53, further comprising code means For suspending invocations of said object by said object-oriented computer article of manufacture prior to said saving the state of the object.

59. The article of manufacture of claim 58, further comprising code means for deleting said object from said first execution environment after said saving the state of the object.

60. The article of manufacture of claim 53, further comprising code means for resuming invocations of said object by said object-oriented computer article of manufacture after said restoring the state of the object.

* * * * *